June 16, 1925.
1,542,258

J. McMENAMIN

MINERAL DETECTOR AND RECTIFIER FOR RADIORECEPTION

Filed Oct. 17, 1922 3 Sheets-Sheet 1

Inventor
Joseph McMenamin

Witnesses:
George A. Gruss
Elizabeth Garbe

By Joshua R. H. Potts
His Attorney

June 16, 1925.

J. McMENAMIN 1,542,258

MINERAL DETECTOR AND RECTIFIER FOR RADIORECEPTION

Filed Oct. 17, 1922     3 Sheets-Sheet 3

Witnesses:
George A. Gruss
Elizabeth Garbe

Inventor
Joseph McMenamin
By Joshua R. H. Potts
His Attorney

Patented June 16, 1925.

1,542,258

UNITED STATES PATENT OFFICE.

JOSEPH McMENAMIN, OF PHILADELPHIA, PENNSYLVANIA.

MINERAL DETECTOR AND RECTIFIER FOR RADIORECEPTION.

Application filed October 17, 1922. Serial No. 595,025.

*To all whom it may concern:*

Be it known that I, JOSEPH McMENAMIN, a citizen of the United States, residing at Philadelphia, in the county of Philadelphia and State of Pennsylvania, have invented certain new and useful Improvements in Mineral Detectors and Rectifiers for Radioreception, of which the following is a specification.

In the reception of radio signals which come into the aerial as high frequency alternating currents, attuned to a selected wave length, the currents are carried by lead-in wire to the receiving apparatus which consists of a tuning device, a rectifying device and a pair of head phones. The high frequency alternating currents are inaudible in the head-phones which, at such high frequency, are sensitive to direct current only. This calls for the use of a rectifying device which will transform the high frequency alternating currents into high frequency direct currents. The rectifying device generally used is known as the mineral or crystal cat-whisker detector, the basic feature of which is mineral, such as galena or silicon which has the property of transforming alternating currents into direct currents. The entire surfaces of these minerals do not possess these rectifying qualities or do not possess them in equal degree. For this reason the "cat whisker", a long thin wire is used to explore the surface of the mineral to detect the sensitive spots. The device is most efficient when the cat-whisker presses very lightly upon a sensitive spot in the mineral and the delicate adjustment required renders the device extremely sensitive to body vibration, the slightest jar being sufficient to throw the detector out of adjustment and the instrument out of commission. Inasmuch as under ordinary conditions of use, and especially on ships, railway trains or other traveling objects, the rectifying device is subject to frequent jars, it is frequently out of commission.

My invention relates to the general type of detector and rectifier described above and has its object to provide an instrument of simple, compact and durable construction which will permit practically instantaneous adjustment without requiring skill on the part of the operator and which, once adjusted, maintains its position regardless of vibration or jarring of the instrument or its supports.

This object, and other advantageous ends which will be described hereinafter, I attain in the following manner, reference being had to the accompanying drawings in which—

Figure 1:
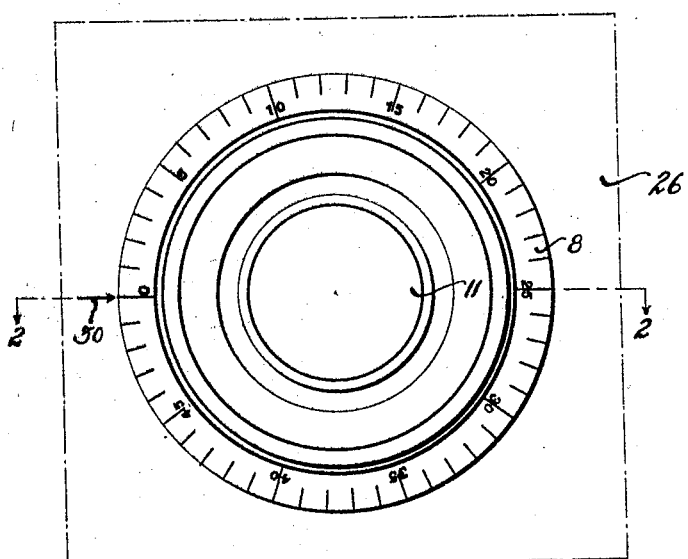
Figure 1 is a top plan view of an instrument embodying my invention.
Figure 2:
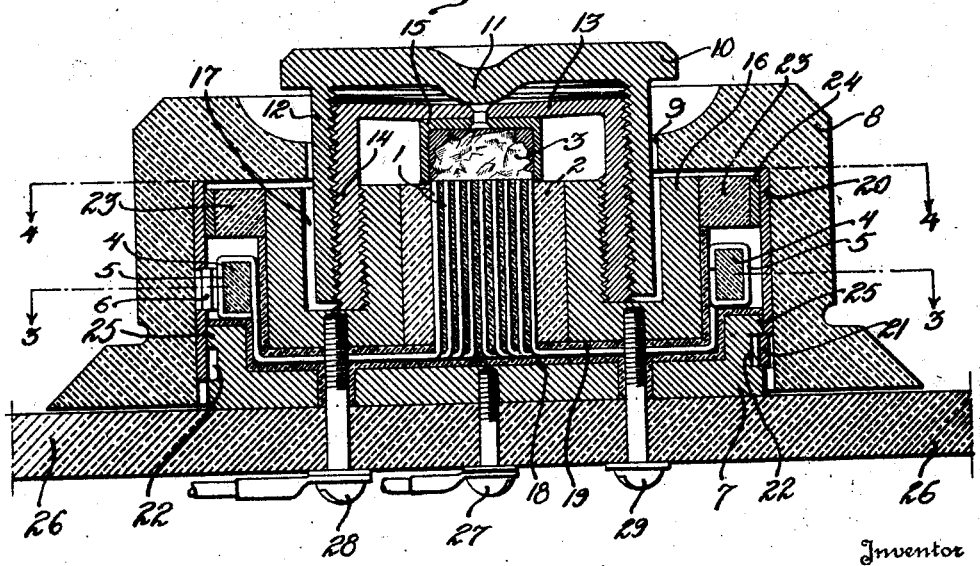
Figure 2 is an enlarged vertical section on line 2—2 of Figure 1.
Figure 3:
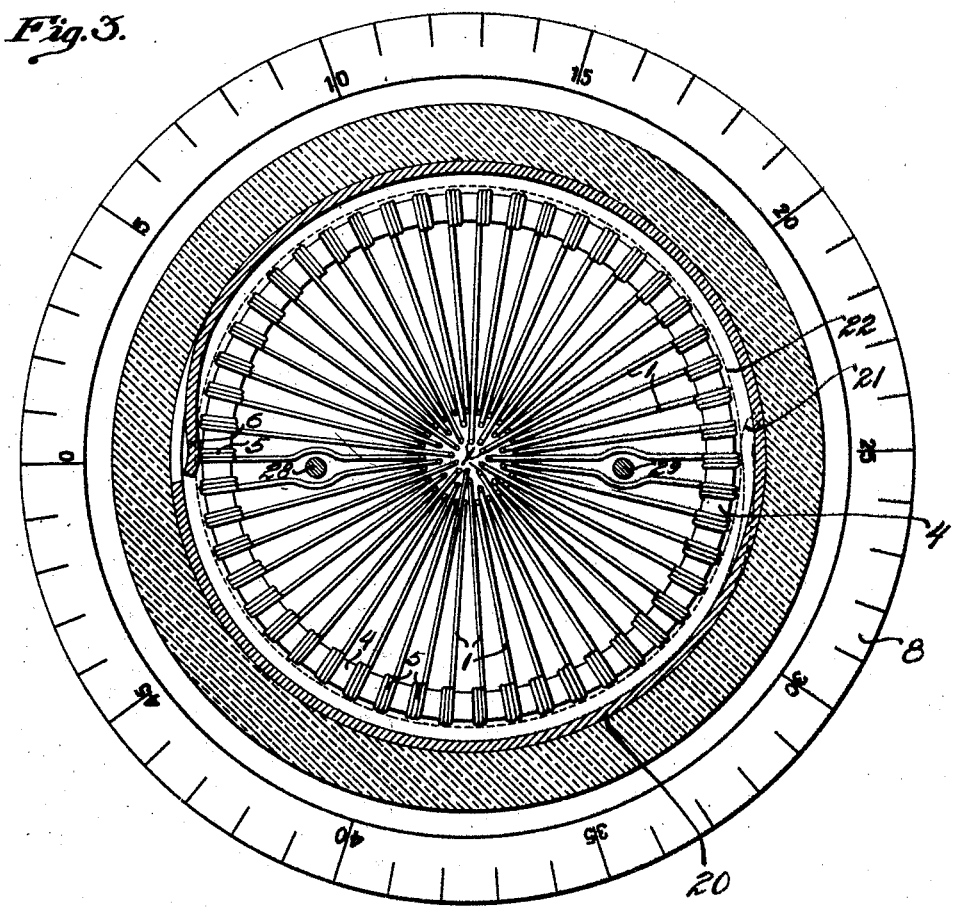
Figure 3 is a horizontal section on line 3—3 of Figure 2.
Figure 4:
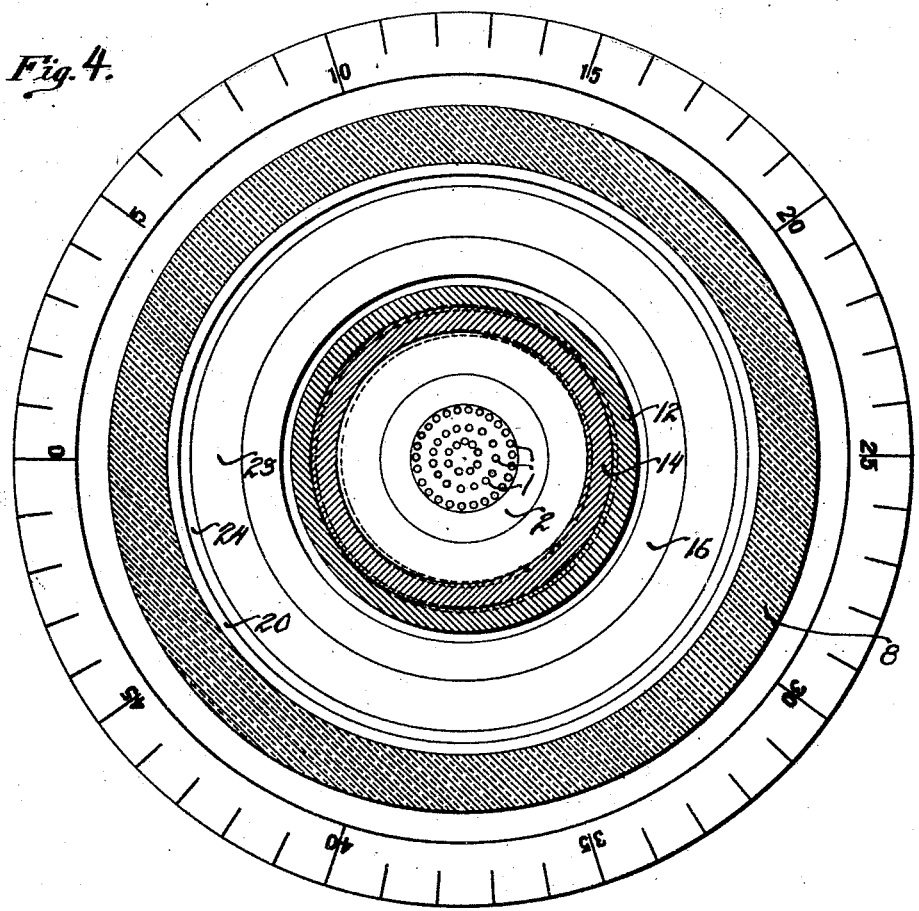

Figure 4 a horizontal section on line 4—4 of Figure 2, and

Figure 5:
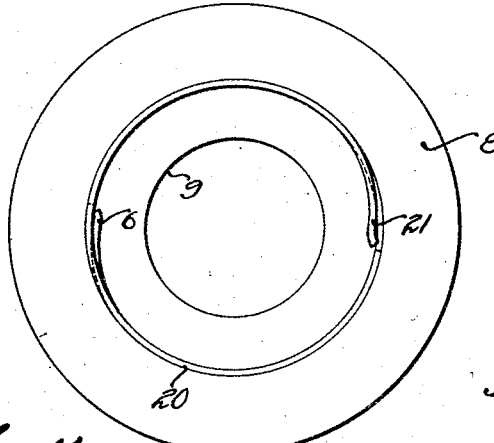

Figure 5 a bottom plan view of the switching knob and its lining.

The vital factor in the invention is a plurality of insulated electric conducting wires compactly grouped at one end with their grouped ends flush with each other and adapted to be engaged by the flush face of a mass of rectifying mineral thereby presenting a plurality of points of contact with the mineral, the other ends of the wires being disposed for contact with a detecting finger.

In the drawings 1 designates the wires, shown as fifty in number. At one end these wires are assembled in a tube 2 with their ends flush and adapted to be engaged by a flush face of a mass of rectifying material 3 which may be galena, silicon or any mineral of like properties. The other ends are looped about an insulating ring 4, as indicated at 5, and so disposed as to be selectively engaged by a detecting finger 6. The aggregation of insulated wires in tube 2 forms what is, in effect, a section of cable and for convenience it will hereinafter be referred to as the multi-point cable. The working parts of the instrument are enclosed by a metallic base plate 7, an annular rotatable, dial-carrying member 8, hereinafter called the switching knob, having its top closed except for a circular central opening 9 adapted to receive a metallic mineral adjuster 10. The mineral adjuster is in the form of an inverted cup having in its top a central convex depression forming a boss 11, and having the inner wall of its depending flange 12 threaded to take over the threaded outer wall of the depending flange 14 of a mineral holder 13 which is also in the form of an inverted cup. The mineral holder has a resilient top adapted to be engaged and depressed by boss 11, and carries a mineral cup 15, in which the mineral is housed. The mineral cup is also an inverted cup and is secured to the top of the mineral holder concentrically. The lower and exposed surface of the mineral is flush with its housing and adapted to engage the flush top of the multi-point cable. Tube 2, which is of insulating material, is seated in the central opening of a metallic ring 16, hereinafter called the securing ring. This ring has a wall of substantial thickness, in which there is a downwardly extending annular recess 17 having its inner wall threaded to receive a thread on the inner wall of flange 14 of the mineral holder. The recess also houses the lower part of the depending flange 12 of the mineral adjuster. The wires 1, leading from the multi-point cable to the insulating ring 4 are insulated from the base plate 7 by an insulating cup 18 and from the securing ring 16 by an insulating cup 19. The switching knob 8 has a metallic lining 20 out of which is pressed the detecting finger 6 and a tongue 21 adapted to engage in a groove 22 in the base plate and hold the dial plate in engagement therewith. An insulating ring 23 surrounds the upper part of securing ring 16 and is surrounded by a metallic ring 24 which contacts with the metallic lining 20 and serves as an upper bearing for the switching knob. Base plate 7 is provided with an annular shoulder 25 which contacts with lining 20 and serves as a lower bearing for the switching knob and to make electrical connection with the detecting finger 6.

The metallic base is mounted upon a panel 26 of insulating material and secured thereto by means of screws 27, 28 and 29. Screw 27 takes into the base and serves as a binding screw to make electrical connection through the base to the detecting finger 6. Screw 28 takes through, but is insulated from, the base and into securing ring 16 and serves as a binding screw to make electrical connection with the securing ring and mineral cup. Screw 29 takes through the base into securing ring 16, is insulated from the base, and serves only as securing means. Panel 26 is provided with an indicating mark 30, shown as an arrow, and primarily registering with the zero mark of the dial. All metallic parts are preferably of brass.

The electrical circuit through the instrument is from binding screw 27, base plate 7, shoulder 25, detecting finger 6, one of the wires which contacts with the mineral, the mineral cup 15, mineral holder 13 and cylinder 16 to binding screw 28.

For operation, the parts being assembled as shown in Figure 2, and in circuit, but with the mineral slightly out of contact with the multi-point cable, mineral adjuster 10 is screwed down over mineral holder 13 causing boss 11 to exert pressure upon the resilient top of the mineral holder, the turning of the adjuster being continued until the flush face of the mineral is brought into contact with the flush face of the multi-point cable, this operation bringing a number of the cable wires into contact with as many sensitive spots on the mineral. Switching knob 8 is then rotated until detecting finger 6 comes into contact with one of the cable wires leading to a sensitive spot on the mineral. The mineral adjuster is then turned back and forth until the signals come in strongest thus indicating the most sensitive adjustment. This adjustment of the mineral relatively to the multi-point cable may be taken as a permanent adjustment. By revolving the switching knob a number of sensitive contacts, but varying in sensitiveness, will be found from which the most sensitive may be selected. When the most sensitive point has once been determined, this adjustment is also permanent but, if for any reason, the switching knob should be turned, the adjustment may be restored by turning the knob to its former position as indicated by the dial.

When the proper contact of the mineral with the opposing face of the cable is once obtained, the contact is permanently held and the detecting finger is also positively held in contact with the wire so that the efficiency of the instrument is not affected by vibration.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A rectifier and detector for radio reception comprising a mass of rectifying material, a plurality of insulated wires grouped at one end to form a compact mass with a flush face and presenting a plurality of fixed contacts opposed to the mineral, and means for selectively bringing any of the wires into circuit.

2. A rectifier and detector for radio reception comprising a mass of rectifying material having a flush face; an insulating tube; a plurality of insulated wires grouped at one end into a compact mass, immediately enclosed by the insulating tube and presenting a flushed face opposed to the flush face of the mineral, and means for selectively bringing any of the wires into circuit.

3. A rectifier and detector for radio reception comprising a mass of rectifying mineral having a flush face; a plurality of insulated wires grouped at one end to form a compact mass and presenting a fixed flush face opposed to the flush face of the mineral, means for selectively bringing any of the wires into circuit, and means for adjusting the mineral relatively to the grouped ends of the wires.

4. A rectifier and detector for radio reception comprising an insulating ring; a plurality of insulated wires grouped at one end and presenting a fixed flush face, the other ends of the wires being connected with the insulating ring; a mass of mineral having a flush face opposed to the flush face of the wires; a rotatable switching knob of insulating material embracing the insulating ring, and a metallic detecting finger carried by the knob and adapted to make electric contact with the ends of the wires connected with the insulating ring.

5. A rectifier and detector for radio reception comprising an insulating ring; a plurality of insulated wires grouped at one end and presenting a fixed flush face, the other ends of the wires being connected with the insulating ring; a mass of mineral having a flush face opposed to the flush face of the wires; a rotatable switching knob of insulating material embracing the insulating ring, and having a metallic lining, and a detecting finger projecting from the lining, adapted to make electric contact with the ends of the wires connected with the insulating ring.

6. A rectifier and detector for radio reception comprising an insulating ring; a plurality of insulated wires, grouped at one end and presenting a flush face, the other ends of the wires being looped over the insulating ring; a mass of mineral having a flush face opposed to the flush face of the wires; a rotatable switching knob of insulating material embracing the insulating ring, and a metallic detecting finger carried by the knob and adapted to engage the looped ends of the wires.

7. A rectifier and detector for radio reception comprising an insulating ring; a plurality of insulated wires, grouped at one end and presenting a flush face, the other ends of the wires being looped over the insulating ring; a mass of mineral having a flush face opposed to the flush face of the wires; a rotatable switching knob of insulating material embracing the insulating ring, and having a metallic lining, and a detecting finger projecting from the lining and adapted to engage the looped ends of the wires.

8. A rectifier and detector for radio reception comprising a mineral holder having a resilient top; a mineral cup secured to the resilient top; a mass of rectifying mineral secured in the cup; a plurality of wires grouped at one end, the grouped ends being opposed to the mineral; a switching finger disposed for contact with the other ends of the wires, and a mineral adjuster adapted to engage with the resilient top of the mineral holder.

9. A rectifier and detector for radio reception comprising a mineral holder having a depending annular flange threaded internally and externally; a metallic securing ring having a depending recess with its inner wall threaded to receive the internal thread of the mineral holder; an insulating tube within the ring; a plurality of wires having one of their ends grouped within the tube, and a switching finger disposed for contact with the other ends of the wires.

10. A rectifier and detector for radio reception comprising a mineral holder having a depending annular flange threaded internally and externally; a metallic securing ring having a depending recess with its inner wall threaded to receive the internal thread of the mineral holder; a mineral adjuster having a depending annular flange threaded internally and adapted to engage the threaded external flange of the mineral holder; an insulating tube within the ring; a plurality of wires having one of their ends grouped within the tube, and a switching finger disposed for contact with the other ends of the wires.

11. A rectifier and detector for radio reception comprising a mineral holder having a depending annular flange threaded internally and externally; a metallic securing ring having a depending recess with its inner wall threaded to receive the internal thread of the mineral holder; an insulating tube within the ring; an insulating ring; a plurality of wires having one of their ends grouped within the insulating tube and their other ends looped about the insulating ring, and a switching finger disposed for contact with the looped ends.

12. A rectifier and detector for radio reception comprising a metallic base plate; a metallic securing ring attached thereto but insulated therefrom; a mineral holder and a mineral adjuster carried by the securing ring; an insulating ring; a plurality of insulated wires having one of their ends grouped within the securing ring and opposed to the mineral and their other ends looped over the insulating ring; a rotatable switching knob; switching means carried thereby adapted to selectively bring the wires into circuit, and means for holding the switching knob in engagement with the base plate.

13. A rectifier and detector for radio reception comprising a metallic base plate; a metallic securing ring attached thereto but insulated therefrom; a mineral holder and a mineral adjuster carried by the securing ring; an insulating ring; a plurality of insulated wires having one of their ends grouped within the securing ring and opposed to the mineral and their other ends looped over the insulating ring; an insulating cup between the base plate and the wires; an insulating cup between the wires and the securing ring; a rotatable switching knob; switching means carried thereby adapted to selectively bring the wires into circuit, and means for holding the switching knob in engagement with the base plate.

14. A rectifier and detector for radio reception comprising a metallic base plate; a metallic securing ring attached thereto but insulated therefrom; a mineral holder and a mineral adjuster carried by the securing ring; an insulating ring; a plurality of insulated wires having one of their ends grouped within the securing ring and the other ends looped over the insulating ring; a rotatable switching knob having a metallic lining; an insulating ring disposed between the securing ring and the knob; a metallic ring disposed between said insulating ring and the lining of the knob, and switching means carried by the knob to selectively bring the wires into circuit.

In testimony whereof I have signed my name to this specification in the presence of two subscribing witnesses.

JOSEPH McMENAMIN.

Witnesses:
  GEORGE B. PARKINSON,
  CHAS. E. POTTS.